United States Patent [19]

Drake et al.

[11] Patent Number: 4,518,429
[45] Date of Patent: May 21, 1985

[54] CORROSION INHIBITING PAINT COMPOSITION

[75] Inventors: Cyril F. Drake, Harlow; Alan Maries, London; Paul F. Bateson, Duxford, all of England

[73] Assignee: ITT Industries, Inc., New York, N.Y.

[21] Appl. No.: 516,664

[22] Filed: Jul. 25, 1983

Related U.S. Application Data

[62] Division of Ser. No. 251,020, Apr. 3, 1981, abandoned.

[30] Foreign Application Priority Data

Apr. 8, 1980 [GB] United Kingdom ............... 8011297

[51] Int. Cl.³ .............................................. C09D 5/08
[52] U.S. Cl. ............................ 106/14.39; 106/14.44; 524/414; 524/436
[58] Field of Search .................. 106/14.39, 14.44, 306; 524/414, 417, 433, 436

[56] References Cited

U.S. PATENT DOCUMENTS

| | | | |
|---|---|---|---|
| 1,654,404 | 12/1927 | Blumenberg | 501/24 |
| 1,830,903 | 11/1931 | Hood | 501/45 |
| 2,192,939 | 3/1940 | Slayter et al. | 501/45 |
| 2,294,844 | 9/1942 | Gelsthamp | 501/45 |
| 3,346,028 | 10/1967 | Griffith | 524/417 |
| 3,989,532 | 11/1976 | Roy et al. | 501/45 |
| 4,126,665 | 11/1978 | Ropp | 501/45 |
| 4,182,437 | 1/1980 | Roberts et al. | 106/36 |
| 4,210,575 | 7/1980 | Drake | 106/14.44 |
| 4,428,774 | 1/1984 | Drake et al. | 106/14.39 |

FOREIGN PATENT DOCUMENTS

| | | | |
|---|---|---|---|
| 2022749 | 2/1973 | Fed. Rep. of Germany | 106/14.05 |
| 580151 | 9/1976 | Switzerland | 106/14.05 |
| 915512 | 1/1963 | United Kingdom | 106/14.05 |

OTHER PUBLICATIONS

Rawson, H.; *Inorganic Glass Forming Systems*, Academic Press, 1967, pp. 160–173.

Imaoka, M.; *Advances in Glass Technology*, compiled by American Ceramic Society, Plenum Press, N.Y., 1962, pp. 149–152.

*Primary Examiner*—Lorenzo B. Hayes
*Attorney, Agent, or Firm*—James B. Raden

[57] ABSTRACT

A corrosion inhibiting material comprises a water soluble glass of the calcium oxide/phosphorus pentoxide type which, when in contact with water, releases phosphate ions which inhibit corrosion of adjacent metal surfaces. The glass solubility may be controlled by the incorporation of one or more glass modifying oxides. Advantageously the glass is finely ground and then dispersed in a resin carrier to form a primer paint formulation.

The preferred glass forming region of a typical calcium oxide/phosphorus pentoxide system is illustrated in the ternary phase/composition diagram of FIG. 1 of the accompanying drawings.

8 Claims, 4 Drawing Figures

COMPOSITIONAL AREA FOR PRACTICABLE GLASS-FORMING.

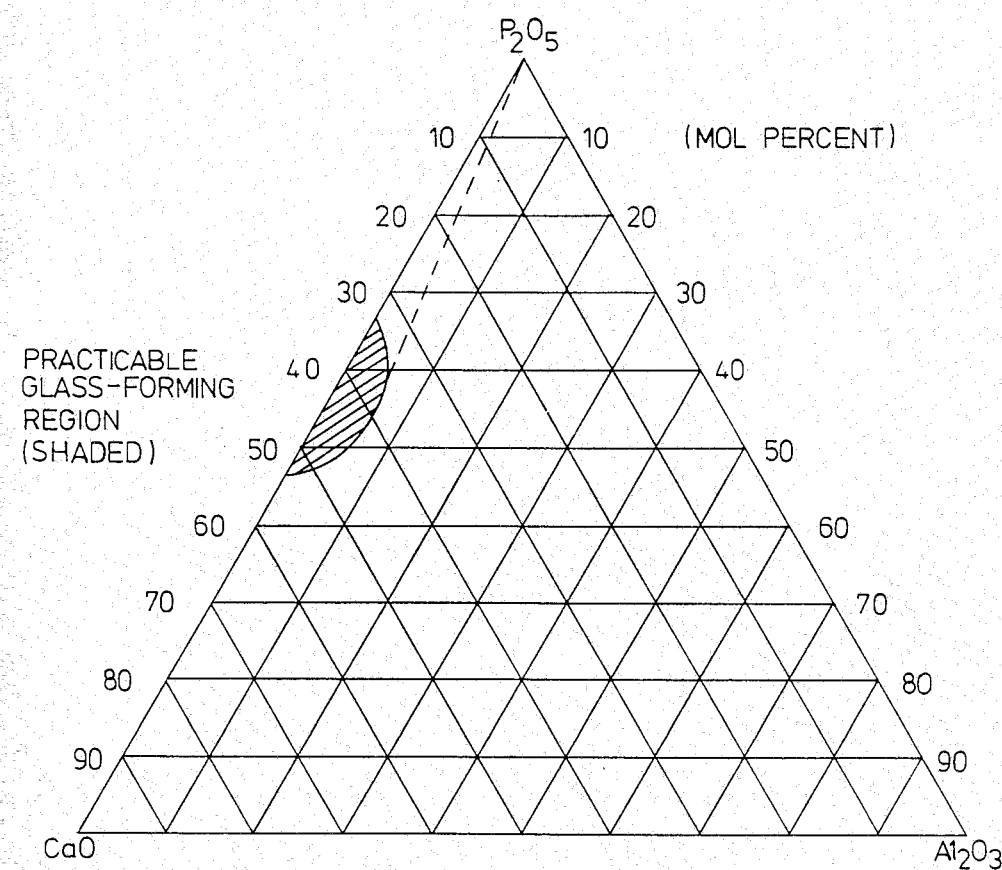
Fig.1 : COMPOSITIONAL AREA FOR PRACTICABLE GLASS-FORMING.

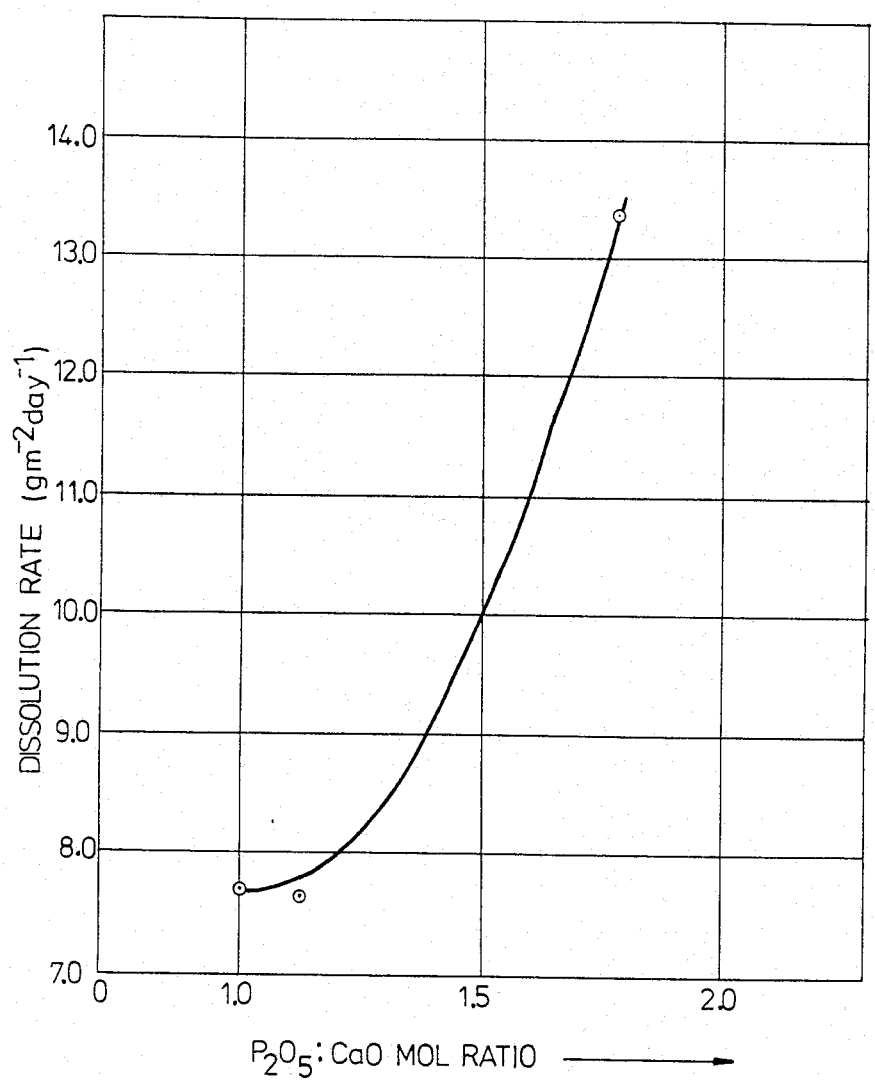
Fig. 2 :— EFFECT ON GLASS DISSOLUTION RATE OF INCREASING $P_2O_5:CaO$ MOL RATIO

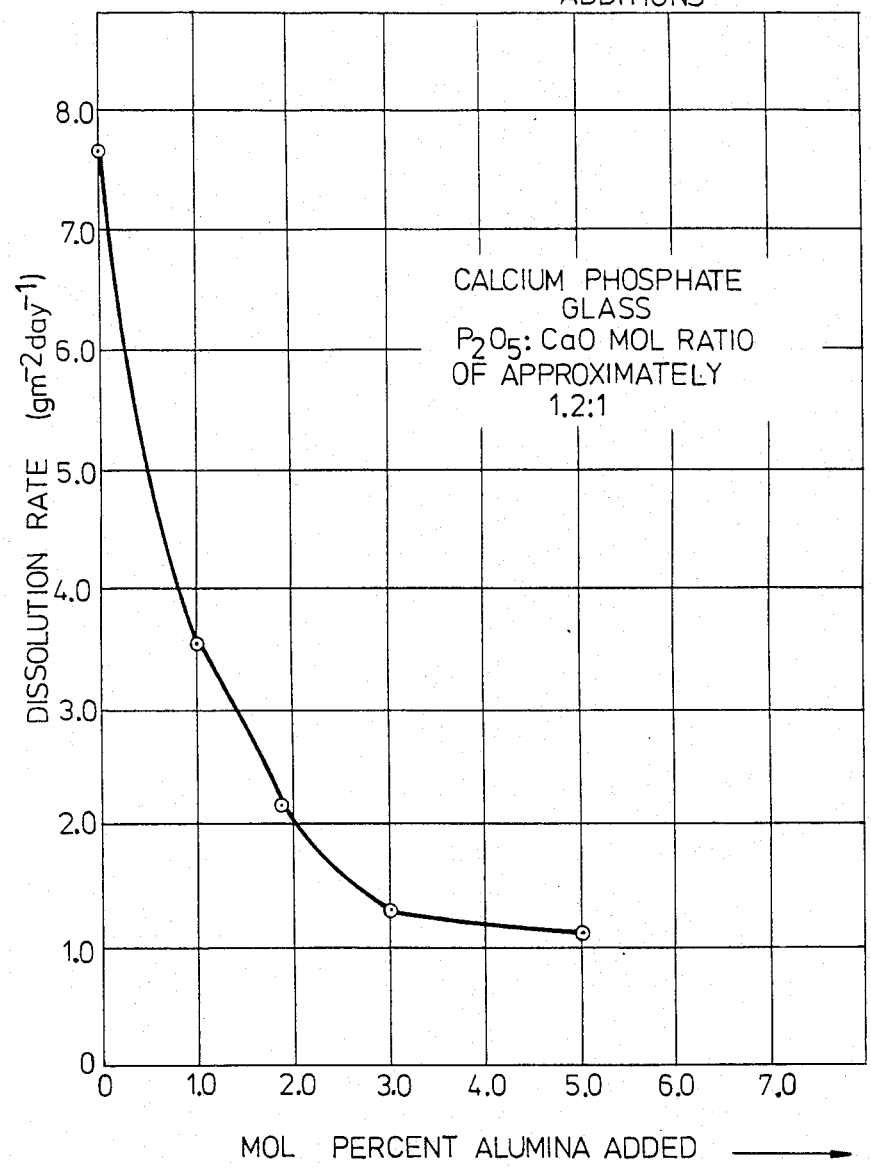

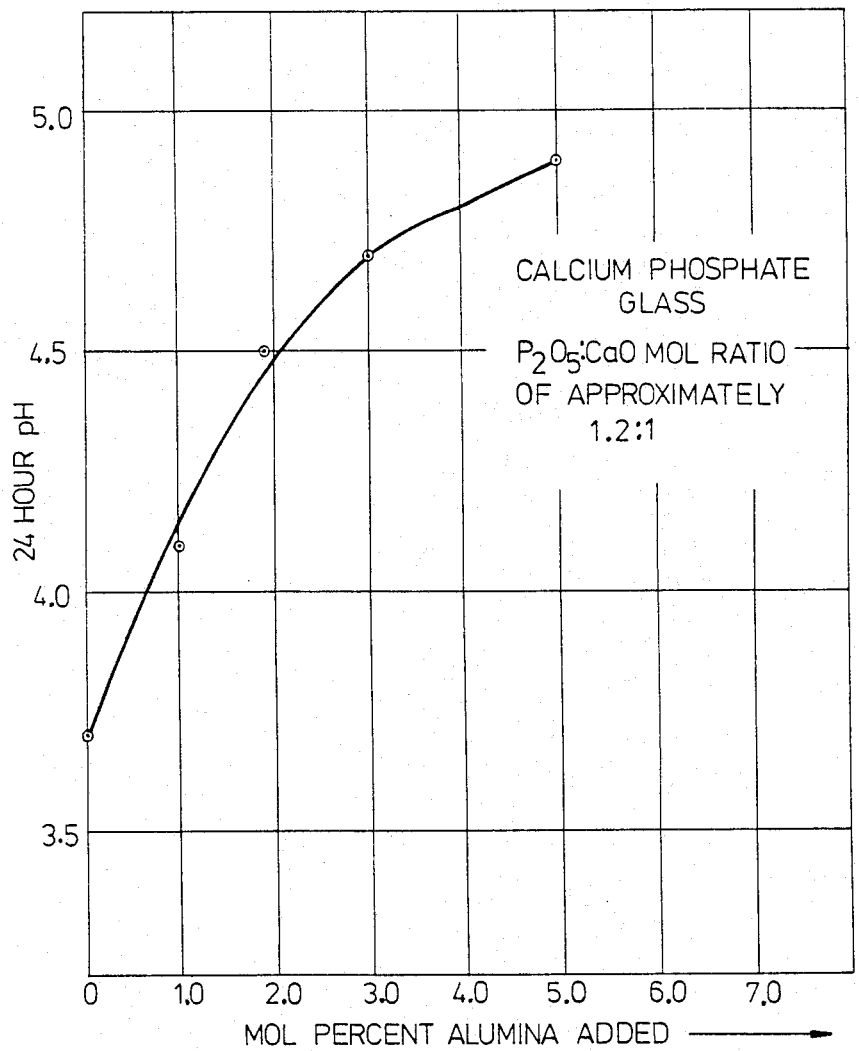
Fig. 4 :- EFFECT ON 24 HOUR pH OF INCREASING ALUMINA ADDITIONS

CORROSION INHIBITING PAINT COMPOSITION

This application is a division of application Ser. No. 251,020, filed Apr. 3, 1981, now abandoned.

This invention relates to coating compositions for inhibiting corrosion of a metal surface to which they may be applied, to glasses for use in said coating compositions and to processes for the preparation and use of the compositions.

One of the major problems involved in the use of metals as structural materials is that of corrosion of the metal, ferrous metals being particularly susceptible. The mechanism of corrosion is incompletely understood, but it is well known that the process is accelerated under hostile conditions, typically in industrial and marine environments. The standard technique for reducing corrosion is to apply to the metal surface a primer coating containing one or more corrosion inhibiting materials. Such primer coatings generally comprise a resinous binding medium in which finely ground pigments are dispersed, the purpose of these pigments being either to provide opacity and colour or to provide corrosion inhibition, these latter being known as active pigments. The most commonly used active pigments are red lead and calcium plumbate, but these materials are highly toxic. Zinc chromate is also employed as a corrosion inhibitor, but it does not possess the level of performance of the lead pigments and can also cause colour bleeding of a subsequent paint coat. Furthermore hexavalent chromium salts are suspected of having carcinogenic activity.

More recently zinc phosphate has been employed as a non-toxic alternative to lead and chromate pigments Compositions employing this material are described in U.K. patent specification Nos. 904,861 and 915,512. It is claimed that this material is almost as effective as the previously employed toxic pigments, but its performance is poor in certain binder media and under conditions of exposure where the atomspheric sulphur dioxide level is low, typically marine conditions. Furthermore where a primed steel surface is to be welded, the use of zinc phosphate paints should preferably be avoided. The intense heat generated in the welding process can cause vaporisation of the paint producing toxic fumes of zinc oxide and/or free zinc.

The aforementioned UK Pat. Nos. 904,861 and 915,512 also describe the use of calcium phosphate (tricalcium phosphate, calcium hydrogen phosphate and mono-calcium dihydrogen phosphate) which avoid the toxicity problem experienced with zinc based paints. However these calcium salts do not possess the optimum values of water solubility and pH for effective corrosion inhibition over a range of paint media and environmental conditions. Also it will be clear that, as the compounds are stoichiometric, these properties are not subject to control.

The object of the present invention is to minimise or to overcome these disadvantages.

U.S. Pat. Nos. 4,210,575 and 4,346,184 describe the use, as anti-corrosion materials, of various zinc aluminophosphate glass pigments. These materials are more effective than the conventional zinc orthophosphate pigments in that they provide zinc and phosphate ions at predetermined optimum rates and ratios under a variety of corrosion conditions.

We have now discovered that glass materials based on the calcium oxide/phosphorus pentoxide system provide effective anti-corrosion pigments and overcome the toxicity problems experienced under certain conditions with zinc containing paints.

According to one aspect of the invention there is provided a glass composition for inhibiting corrosion of a steel surface by releasing corrosion inhibiting ions when in contact with water, said composition comprising a glass including phosphorus pentoxide as a glass forming oxide, and calcium oxide as a glass modifying oxide.

The term 'glass pigment' as employed herein is understood to include not only homogeneous glasses but also partially devitrified and partially phase separated materials which have been reduced to a powder of pigmentary grade by successive stages of comminution and milling. All the glass compositions referred to herein are described, for simplicity, in terms of the molar proportions of their constituent oxides although of course those oxides are not necessarily present in their free form.

It is important to be able to adjust and control the dissolution rate, the ionic ratio and the solution pH of anti-corrosion pigments to optimise the pigment performance under various conditions, e.g. marine, neutral or industrial, and in different paint media, e.g. natural or synthetic resins, chlorinated rubbers or cellulose derivatives. The glasses described herein are designed to release calcium and phosphate ions into solution at predetermined rates, and the glass composition is therefore tailored to provide the desired dissolution rate. The dissolution rate of the glass is determined primarily by the proportion of the acid glass forming oxide (phosphorus pentoxide) present in the composition. An increase in this proportion increases the glass dissolution rate correspondingly and, conversely, a decrease in this proportion decreases dissolution rate. Another technique that can be employed to determine glass dissolution rate is to incorporate in the glass a proportion of additional glass modifying oxides, in particular metal sesquioxides such as alumina ($Al_2O_3$). Thus, the addition of a quantity of alumina decreases the dissolution rate of the glass. Conversely the dissolution rate of the glass is enhanced by the incorporation of one or more alkali metal oxides.

Techniques of glass pH and dissolution rate control are more fully described in our U.S. Pat. No. 4,350,675.

Embodiments of the invention will now be described with reference to the accompanying drawings in which:

FIG. 1 represents the phase/composition diagram of the calcium oxide/phosphorus pentoxide/alumina system;

FIGS. 2 and 3 indicate the relationship between dissolution rate composition and dissolution rate of the glasses of FIG. 1; and FIG. 4 illustrates the relationship between glass composition and solution pH.

The inhibiting glass compositions are described herein by way of example with reference to the calcium oxide/phosphorus pentoxide/alumina ternary system. It will be clear that the calcium oxide/phosphorus pentoxide glass compositions are not limited to those incorporating alumina as a further glass modifying oxide. Thus, other glass modifying oxides may be incorporated in place of or in addition to alumina. Suitable oxides for incorporation in the glass include, but are not limited to, alkali metal oxides, zinc oxide, magnesium oxide, barium oxide, strontium oxide, ferric oxide or mixtures thereof.

Alternatively this third oxide can be dispensed with and the glass dissolution rate adjusted to a desired value by suitable control of the calcium oxide/phosphorus pentoxide molar ration.

It is of course not possible to form glasses from every possible combination within the ternary system shown in FIG. 1, and we have found experimentally that the practical glass forming limits for this ternary system are those indicated by the shaded region of the diagram. The compositions within the practical glass-forming limits can usefully be described in the form of the molar percentages of the hypothetical constituent stoichiometric oxides.

It will be appreciated by those skilled in the glass forming art that the phase boundaries of any glass system are ill defined and that it is possible, under certain conditions, to form glasses which are outside the normally accepted phase boundary. The diagram of FIG. 1 should thus be taken as an approximate rather than an absolute indication of the limits of the glass forming region.

The dissolution rate of the glass is a function of its composition, in general decreasing with increasing content of calcium oxide and/or alumina in the glass. The effect of the calcium oxide concentration on glass dissolution rate is illustrated in FIG. 2 and the effect of the alumina concentration on glass dissolution rate and pH are illustrated respectively in FIGS. 3 and 4 of the accompanying drawings. Furthermore the nature of the phosphate species released on dissolution and the pH thus obtained, both of which affect the corrosion inhibiting properties of the material, vary with the calcium oxide/phosphorus pentoxide ratio. With reference to FIG. 4, the 24 hour pH measurement is defined as the pH attained by a suspension of 0.5 g glass shaken in 75 ml. deionised water at 25° C. for 24 hours.

The soluble glass pigments may be present in a paint formulation either as the entirety of the active pigment volume, or as a replacement for certain conventional pigments when they may exhibit a synergistic effect on the inhibition of corrosion. In other applications glass pigments of different solubilities may be blended in the same paint medium to provide corrosion inhibition both in the short term and over an extended period. This technique may also be employed to optimise the performance of a coating which may be subject to exposure in environments of different degrees of aggression.

The use of the glasses is not of course limited to paint compositions. Thus they may also be incorporated, for example, in reinforced concrete to prevent corrosion of steel reinforcing rods, or in water repellent grease compositions. In such applications the glasses may be provided in the form of fibres, granules, blocks, powders, stoving enamels etc. They may also be applied to various substrates by plasma spraying, flame spraying, electrostatic coating, electrodeposition, etc.

The glass compositions are prepared by fusing a mixture of the constituent oxides, or compounds which on heating decompose to form the respective oxides, for a sufficient period of time to form an homogeneous melt. For example one or more of the metal oxides may be substituted by the metal carbonate, acetate, citrate or mixtures thereof. The phosphorus content of the glass may be added as phosphorus, pentoxide, ammonium dihydrogen phosphate, aqueous phosphoric acid or mixtures thereof. Advantageously a slight excess of the phosphorus compound may be provided in the mix to compensate for the loss by evaporation of phosphorus pentoxide during the fusion process. The melt so formed is quenched rapidly to solid material by pouring either on to a cool steel plate or on to water-cooled rollers. Quenching may also be achieved by pouring the molten glass into a bath of water or an oil. We have found that, although the glass is water soluble, its solubility is sufficiently low that only a small proportion is lost by dissolution when water quenching is employed as the glass is in contact with water only for a short time.

The quenched material, which may be in the form of flakes, granules or slabs, is then comminuted to a fine powder by one or more stages of crushing or grinding. Typically the glass is jaw crushed, or dry milled in a pestle and mortar or pin disc mill, or wet ground in a rotary or vibratory ball mill followed by drying, or by air impact milling. Any other methods well known in the art can also be employed.

The powdered glass thus manufactured may be incorporated in a paint vehicle to form a corrosion inhibiting primer by two-stage ball milling, high speed dispersion or by other means well known in the art. We prefer to use an alkyd resin as the paint binder medium, but it will be appreciated by those skilled in the art that other conventional resins or binders can be employed, e.g. epoxy resins, acrylics or chlorinated rubbers.

For structural applications in which thick coatings are used, i.e. 50 to 100 microns thickness or even more, the glass should be comminuted to a final size in which the majority by weight of the particles are below 60 microns in average diameter and for some applications below 15 and preferably below 10 microns in average diameter.

Unlike prior corrosion resistant compositions, the glass compositions described herein are essentially colourless. Thus, they may be used in paint compositions as the sole pigment or together with the desired final colouring pigment. As such, a single coating of the present composition will in many instances be adequate for both corrosion resistance and final colour. Thus, the present paint compositions may be the sole paint coating on a metal surface.

In a typical example, measured amounts of calcium carbonate, aluminium hydroxide, and concentrated phosphoric acid were blended into a paste. This mix was fused to a homogeneous melt in an electric furnace at 1100° C. for one hour in a platinum crucible, and was then quenched to a glass by pouring onto a cold steel plate. The glass was comminuted to a fine pigment grade powder by successively crushing and milling. Its chemical composition was

| CaO | 48.2 | mol % |
| $P_2O_5$ | 49.1 | mol % |
| $Al_2O_3$ | 2.7 | mol % | and the dissolution rate of a $-710+500$ μm fraction was measured as 4.17 g $m^{-2} day^{-1}$.

By way of example, the compositions listed in Table I were individually prepared by blending together appropriate amounts of calcium carbonate, phosphoric acid, sodium carbonate, zinc oxide or aluminum hydroxide, and fusing to form a melt at elevated temperature. The melts so formed were then quenched by pouring onto a cold steel plate and the glass obtained was successively crushed granulated, pin-disc milled and finally passed through an air impact mill. The compositions of these glasses were estimated by batch weight loss and are listed in Table I with dissolution rates and pH.

TABLE I

| Sample | CHEMICAL COMPOSITION mol percent oxide | | | | | Dissolution Rate $gm^{-2}day^{-1}$ | 24 hr. pH |
|---|---|---|---|---|---|---|---|
| | CaO | $P_2O_5$ | $Al_2O_3$ | $Na_2O$ | ZnO | | |
| 1 | 47.2 | 52.8 | — | — | — | 7.66 | 3.7 |
| 2 | 45.3 | 53.7 | 1.0 | — | — | 3.55 | 4.1 |
| 3 | 44.6 | 53.5 | 1.9 | — | — | 2.17 | 4.5 |
| 4 | 43.8 | 53.2 | 3.0 | — | — | 1.30 | 4.7 |
| 5 | 50.0 | 50.0 | — | — | — | 7.71 | 4.9 |
| 6 | 36.1 | 63.9 | — | — | — | 13.40 | 3.1 |
| 7 | 48.2 | 49.1 | 2.7 | — | — | 4.17 | 5.3 |
| 8 | 42.1 | 52.9 | 5.0 | — | — | 1.14 | 4.9 |
| 9 | 23.0 | 45.4 | — | 31.6 | — | 69.5 | 6.6 |
| 10 | 40.7 | 54.0 | — | — | 5.3 | 8.06 | 3.8 |
| 11 | 35.4 | 64.6 | — | — | — | 13.60 | 3.0 |

It is preferred that the glass compositions lie within the composition range 30 to 60 mole % calcium oxide and 40 to 70 mole % phosphorus pentoxide. Advantageously the compositions are within the range 32 to 54 mole % calcium oxide and 46 to 68 mole % phosphorus pentoxide. In each case the remainder, if any, comprises alumina, magnesia, zinc oxide, an alkali metal oxide or mixtures thereof. The glasses when comminuted and dispersed in a resin (which may be an oleoreinous material, a chlorinated rubber, an epoxy urethane, acrylic, alkyd, amino, vinyl, or phenolic resin, or a cellulosic polymer) provide paint formulations which can be employed to inhibit ferrous metal corrosion under a variety of conditions, the glass composition being capable of adjustment to provide the optimum ion release rate corresponding to the particular corrosion conditions anticipated. The paint formulations may for example be employed for the surface protection of steel structures, ships, vehicle bodies and freight containers.

By way of example, the compositions listed in Table I were individually prepared by blending together appropriate amounts of calcium oxide, phosphoric acid and aluminium hydroxide, and fusing to form a melt at elevated temperature. The melts so formed were then quenched by pouring onto a cold steel plate and the glass obtained was finely ground and then milled in a non-aqueous medium in a ball mill. The wet slurry of powdered glass was then filtered and dried. These glasses had the compositions listed in Table I. Two of these compositions were then evaluated by preparing small quantities of test paints to the following formulation:

Resin system: short-oil alkyd in xylene
Total pigment volume concentration (%): 40
Proportion by weight of glass to total pigment solids (%): 20

The paints were prepared by high-speed dispersion to a fineness of grind of 30 microns and were then applied to clean mild steel coupons by spiral film and allowed to cure. The coating was then cross-cut.

The coupons were then subjected to accelerated salt spray test schedule as defined in British Standard No. 3900 using a commercially available priming paint for comparison.

The results of such tests are summarised in Table II and show that the glass pigments give effective protection against corrosion at significantly lower loadings in a paint coating than those specified for conventional pigments such as zinc orthophosphate, when evaluated either by resistance to rusting or lack of blistering of the paint film.

Paints containing soluble glass pigments are especially effective in preventing rusting of the metal surface and blistering of the paint film. In particular, paints containing the soluble glass pigments described herein are especially effective in preventing rusting of steel surfaces where the dried paint film has been removed by mechanical damage.

TABLE II

Results of accelerated salt spray testing of mild steel coupons coated with high-build, short-oil alkyd test paints

| Active pigment sample | Proportion of active in total pigment (% w/w) | 250 hrs. in salt spray |
|---|---|---|
| Pigment sample 10 | 20 | Very little cross-cut rusting and no staining. No blistering. |
| Pigment sample 11 | 20 | Some cross-cut rusting with slight staining. Slight blistering adjacent to cross-cut and on primer surface. |
| Zinc* orthophosphate | 40 | Severe rusting of primer film and at cross-cut. Considerable pustuling over all primer surface. |

*Commercially available high build primer for comparison.

We claim:

1. In a corrosion inhibiting paint formulation adapted to protect a metal surface to which it is applied, said formulation comprising a resin binder vehicle and a corrosion inhibiting glass powder dispersed therein; the improvement comprising, as said glass powder, a glass comprising from 32 to 54 mole % calcium oxide, from 46 to 68 mole % phosphorus pentoxide and a glass modifying oxide selected from the group consisting of alumina, magnesia, strontium oxide, barium oxide, zinc oxide, ferric oxide, an alkali metal oxide and mixtures thereof, the composition of the glass being such that it releases corrosion inhibiting ions when in contact with water.

2. The paint formulation of claim 1 wherein the resin binder is selected from the group consisting of a chlorinated rubber and an epoxy, urethane, alkyd, amino, vinyl, phenolic, and cellulosic polymer.

3. The paint formulation of claim 1 including a coloring pigment.

4. The paint formulation of claim 1 comprising 36.1 mole % calcium oxide and 63.9 mole percent phosphorus pentoxide.

5. The paint formulation of claim 1 wherein the glass modifying oxide is selected from the group consisting of sodium oxide, potassium oxide and mixtures thereof.

6. The paint formulation of claim 1 wherein the glass modifying oxide is alumina.

7. The paint formulation of claim 1 wherein said powder has an average particle size of 10 to 60 microns.

8. The paint formulation of claim 7 wherein the powder has an average particle size of 20 to 40 microns.

* * * * *